US008347499B2

(12) United States Patent
Grzondziel et al.

(10) Patent No.: US 8,347,499 B2

(45) Date of Patent: Jan. 8, 2013

(54) METHOD FOR PRODUCING A TURBINE CASING

(75) Inventors: Beate Grzondziel, Gebenstorf (CH); Michael Fischer, Gippingen (CH)

(73) Assignee: ALSTOM Technology Ltd, Baden (CH)

( * ) Notice: Subject to any disclaimer, the term of this patent is extended or adjusted under 35 U.S.C. 154(b) by 1062 days.

(21) Appl. No.: 12/270,539

(22) Filed: Nov. 13, 2008

(65) Prior Publication Data

US 2009/0126190 A1 May 21, 2009

(30) Foreign Application Priority Data

Nov. 16, 2007 (CH) ....................................... 1774/07

(51) Int. Cl.

*B21K 25/00* (2006.01)
*B23P 17/00* (2006.01)
*B23P 11/00* (2006.01)
*F01D 25/24* (2006.01)

(52) U.S. Cl. ..... 29/889.2; 29/888.02; 29/412; 29/527.5; 29/527.6; 29/428; 415/214.1; 415/215.1; 415/915; 164/460; 164/464

(58) Field of Classification Search ................. 29/889.2, 29/889.5, 412, 469, 557, 558, 527.1, 527.5, 29/527.6, 428, 888.02; 415/108, 101, 103, 415/214.1, 215.1, 915; 164/47, 459, 460, 164/461, 464, 421

See application file for complete search history.

(56) References Cited

U.S. PATENT DOCUMENTS

| | | | | |
|---|---|---|---|---|
| 3,544,232 | A | 12/1970 | Zerlauth | |
| 3,642,380 | A | 2/1972 | Saunders | |
| 3,741,680 | A | 6/1973 | Killmann et al. | |
| 3,982,849 | A | 9/1976 | Bernasconi et al. | |
| 4,519,207 | A | 5/1985 | Okabe et al. | |
| 4,762,462 | A | 8/1988 | Lardellier | |
| 5,104,285 | A | 4/1992 | Groenendaal, Jr. et al. | |
| 5,199,256 | A | 4/1993 | Moore | |
| 6,415,846 | B1 * | 7/2002 | O'Hara | 164/47 |
| 6,945,046 | B2 * | 9/2005 | Allmang et al. | 60/602 |
| 7,198,465 | B1 * | 4/2007 | Ichiryu | 415/214.1 |
| 7,441,331 | B2 * | 10/2008 | Hudson et al. | 29/889.721 |

FOREIGN PATENT DOCUMENTS

| | | | |
|---|---|---|---|
| DE | 1751055 | A1 | 8/1970 |
| DE | 2503493 | A1 | 7/1976 |
| DE | 3837510 | A1 | 5/1990 |

* cited by examiner

*Primary Examiner* — Sarang Afzali

(74) *Attorney, Agent, or Firm* — Volpe and Koenig, P.C.

(57) ABSTRACT

A method for producing a turbine casing for a rotating machine is provided. The casing is manufactured by a casting process, and is cast in two casing halves which are separated by a parting plane which passes axially through the turbine casing. Each casing half is first cast in one piece in each case, and each casing half is separated into at least two casing sections which are joined together for forming a casing half in each case.

6 Claims, 1 Drawing Sheet

METHOD FOR PRODUCING A TURBINE CASING

FIELD OF INVENTION

The invention refers to a method for producing a turbine casing for a rotating machine, which casing is manufactured by a casting process, in which the turbine casing is cast separately in two casing halves which are separable by a parting plane which passes axially through the turbine casing, and in which the two casing halves are composed of at least two separate casing sections.

BACKGROUND

Turbine casings for rotating machines, which radially enclose a flow passage along which the operating medium axially expands, producing expansion energy, and as a result of which a rotor arrangement is arranged, which is enclosed by the turbine casing and equipped with rotor blades, serve as a support structure for stator blades which project into the spaces between the stator blade rows which are attached on the rotor side. For construction and installation reasons, turbine casings are composed of at least two casing halves which are joined together via an axially extending parting plane in each case to form a uniform turbine casing. As a result of the split design in each case of the so-called upper and lower turbine casing halves, an installation-friendly fitting is possible of the turbine stator blades in the stator blade root recesses, which are provided in and along the turbine casing inner wall and around it in the circumferential direction, before the two turbine casing halves are joined together.

Furthermore, turbine casings which for installation reasons are not only composed of an upper and a lower turbine casing half but, moreover, are composed of at least two casing sections per turbine casing half, are of particular interest. Such a construction may be explained in more detail as representative of further turbine casing designs based on the example of a low-pressure steam turbine stage, as used for example in combined cycle power plants. Combined cycle power plants are power plants which provide a combined gas turbine and steam turbine cycle, i.e. the hot exhaust gases which issue from the gas turbine unit are used for steam generation and the steam which is generated in the process is used for operating suitable steam turbines stages, for example for operating a low-pressure steam turbine stage in this way. Combined cycle power plants of the above generic type can be taken for example from U.S. Pat. Nos. 5,199,256 or 4,519,207.

A cross-sectional view through the turbine casing of a typical low-pressure steam turbine is shown in DE 25 03 493 with reference to FIG. 1, which has a turbine casing which is composed of two times three parts. Thus, both the upper and the lower turbine casing half is composed of three casing sections which are axially joined together in each case, of which the center casing section together with an internally-disposed rotor arrangement includes a flow passage which conically widens axially on both sides. A casing end section is axially connected on both sides in each case to the ends of the center casing section, which casing end section is referred to as a blade carrier, particularly as a stator blade row is fastened to this in each case. The two casing end sections, which are axially connected by the face end to the center casing section in each case, are connected in a fixed manner via corresponding connecting constructions to the center casing section. The production of all the individual parts, of which the turbine casing described above is composed, is carried out within the scope of separate casting processes in each case so that each individual component requires a separate casting mold in each case which is used in separate casting processes in each case which are independent of each other. Such a procedure is not only time-intensive, and therefore cost-intensive, but furthermore requires a high-precision reworking of the individual casing sections in order to join them together in an accurately fitting manner to form a uniform turbine casing. The turbine casing of a low-pressure steam turbine is typically enclosed by a further casing, that is to say by the so-called outer casing, as this is described for example in DE 38 37 510 C2.

SUMMARY

The present disclosure is directed to a method for producing a cast turbine casing for a rotating machine. The method includes casting the turbine casing separately in two casing halves which are separable by a parting plane which axially passes through the turbine casing, and in which the two casing halves are each comprised of at least two separate casing sections, each of the casing halves are cast in one piece. The method also includes separating each of the casing halves into the at least two casing sections. The method further includes joining the separated casing sections together to form a respective assembled one of the casing halves; and joining the two assembled casing halves together along the parting plane to form the turbine casing.

BRIEF DESCRIPTION OF THE DRAWINGS

With reference to the single exemplary embodiment, the method according to the solution is illustrated in a non-restrictive manner with regard to the general inventive idea.

DETAILED DESCRIPTION OF THE PREFERRED EMBODIMENTS

Introduction to the Embodiments

Figure 1A:
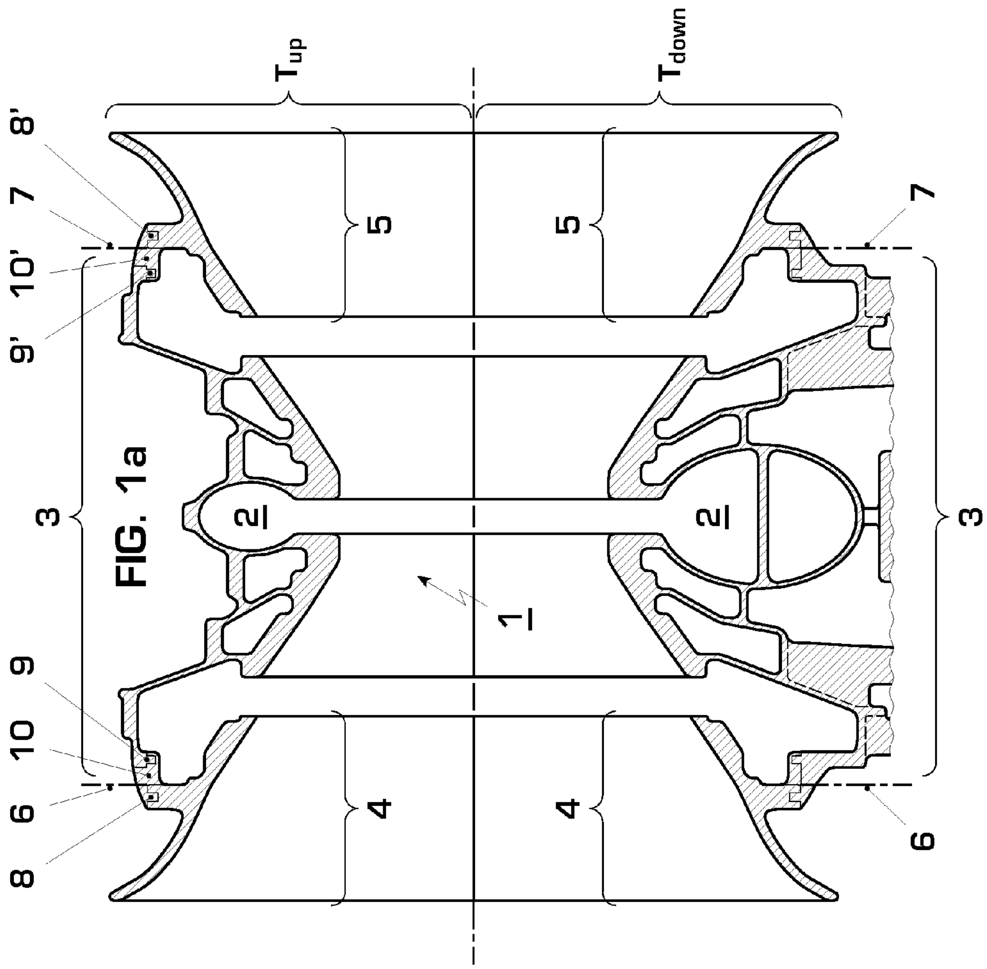
FIG. 1*a* shows a longitudinal section through an inner casing of a low-pressure steam turbine.

The invention is based on the object of developing a method for producing a turbine casing for a rotating machine, which casing is manufactured by a casting process, in which the turbine casing is cast separately in two casing halves which are separable by a parting plane which passes axially through the turbine casing, and in which the two casing halves are composed of at least two separate casing sections, in such a way that the production and installation of such a turbine casing can be realized in a simpler, quicker and more cost-effective manner. Moreover, measures are to be adopted by which the manufacturing accuracy, with which the individual casing sections are assembled, can be improved.

The achieving of the object upon which the invention is based is disclosed in claim 1. Features which advantageously develop the inventive idea are the subject of the dependent claims and are also to be gathered from the description especially with reference to the exemplary embodiment.

The method according to the solution for producing a turbine casing for a rotating machine, which casing is manufactured by a casting process, is described below by the combination of the following method steps: the upper and the lower casing half respectively of the turbine casing are cast within the scope of a single casting process separately from each other in each case, but in themselves cast in one piece in each case as one-piece casing halves. If, for example, the upper and lower casing halves comprise casing sections which are to be separated into three in each case, then all three casing sections are produced continuously in a single casting process.

Upon completion of the casting process, the upper and the lower casing half is separated in each case into at least two, or, in keeping with the above example, into three different casing sections.

Furthermore, the casing sections, which are separated from each other, are joined together for forming in each case an assembled casing half. Before the respective connecting of the respective casing sections, it may be necessary to correspondingly rework the parting edges which are created during the separation, for example by a purposeful removal of material.

If upper and lower casing halves which are assembled in each case from the individual casing sections are involved, then they can be connected in a conventional manner along their axial parting plane for forming the complete turbine casing.

The departure from the separate production of all the individual casing sections, which are required for a complete assembly of a turbine casing, to a uniform manufacture of the upper and lower casing half in each case, leads according to the present solution, moreover, to further advantages in addition to the advantage of only a single casting process per turbine casing half in each case, such as a quicker and uniform quality check of the cast part, cost reduction for a further treatment of the uniformly available cast part until separation into individual casing sections, and better assurance of uniform manufacturing qualities since the casting process is carried out with a material of uniform grade and quality, to name only a few advantages.

Since the individual turbine casing sections are exposed during their intended use to high mechanical as well as thermal stresses, it is not advantageous to interconnect the individual casing sections in a fixed manner, but to interconnect them in a preferably loosely sliding manner so that thermally-induced material expansions inside the turbine casing can be compensated in order to avoid mechanical distortions inside the turbine casing in this way.

In an especially advantageous embodiment, for this purpose the casting molds for the production of the upper or of the lower turbine casing half in each case are formed separately in the contour regions, along which the separation of the respective casing sections is intended. In this way, only connecting ribs or casing wall sections with reduced wall thickness, for example in the form of intended break points, can be provided here, so that a subsequent separation, for example by a mechanically assisted separation, can be made easier and therefore carried out in a purposeful manner.

Moreover, when forming the casting mold, joining contours are already provided in the regions along the parting edges, which are formed as a result of the separation, of the casing sections which are to be separated in each case. A tongue-and-groove connection, for example, represents a possible design of such a joining contour, in which a slot-shaped recess is provided in the region of the parting edge of one casing part and a rib-like projection is provided in the region of the parting edge of the other casing part. The parting edges of the respective casing parts, and also the joining contours which are associated with them, extend in a semi-circular manner on account of the half-shell-like design in each case of the respective turbine casing half. The joining contour, which is already formed by the casting process, should be formed subject to a mold flow connection which is as fluidtight as possible, which, moreover, for reasons of a compensation in the case of thermal material expansions, is to enable a mounting which is as loose as possible of the casing sections which are to be interconnected.

Detailed Description

FIG. 1*a* shows a longitudinal section through an inner casing of a low-pressure steam turbine which is composed of an upper and a lower turbine casing half $T_{up}$ and $T_{down}$. It may be assumed that the two turbine casing halves $T_{up}$ and $T_{down}$ are joined together along the axial parting plane 1 in a fluidtight, mechanically fixed manner, as is to be gathered for example from DE-OS 1751 055, from which originates a joining technique for connecting two casing halves for turbomachines, especially axially separated casings of for example high-temperature turbines.

The turbine casing which is shown in a schematized view in FIG. 1*a* corresponds to the inner casing of a double-flow low-pressure steam turbine in which steam admission is carried out centrally from the feed volume 2 radially inwards into the operating passage in which the steam is able to expand axially on both sides along the turbine casing internal contour, which conically widens in each case, producing expansion work, as a result of which a rotor unit, which is not shown in the figure, is set into rotation.

On account of the design of the upper and the lower turbine casing half $T_{up}$, $T_{down}$, which is essentially symmetrical to the axial parting plane 1, the further description is concentrated upon the upper turbine casing half, bearing in mind that subsequent embodiments can be equally also transferred to the component parts of the lower turbine casing half $T_{down}$.

The upper turbine casing half $T_{up}$ which is shown in FIG. 1*a* has been produced in a single casting process and represents a one-piece component. However, the upper turbine casing half $T_{up}$ can be divided into three sections, specifically the center casing section 3 and also the side casing end sections 4 and 5. For further assembly of the upper turbine casing half it is necessary to combine the sections 3, 4, 5 which are described above. For this purpose, for example the casing end section 4 is separated along the specified parting line 6 from the center casing section 3 by a sawing or cutting process. A corresponding separation between the center casing section 3 and the right-hand casing end section 5 is carried out along the parting line 7.

Figure 1B:
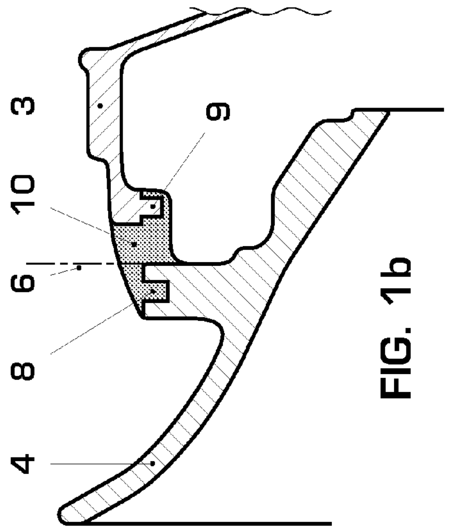
FIG. 1*b* shows a detailed view of a connecting point of the inner casing.

On closer inspection of the parting edges of the two casing sections 3, 4 and 5, which are formed during the separation, it is to be seen that for example a slotted recess 8 is provided in the casing end section 4 and a rib-like projection 9 is correspondingly provided in the region of the parting edge of the center casing section 3, wherein the slotted recess 8 is formed in a counter-contoured manner, corresponding to the projection 9, as shown in FIG. 1*b* in the detailed view of the casing section 4 and of the adjoining casing section 3 of the upper turbine casing half $T_{up}$. Corresponding joining contours are provided on the parting edges with regard to the casing end section 5 and on the parting edge, which is axially opposite this, on the center casing section 3; see the slot-shaped recess 8' and also the rib-like projection 9' as shown in FIG. 1*a* concerning this.

Figure 1C:
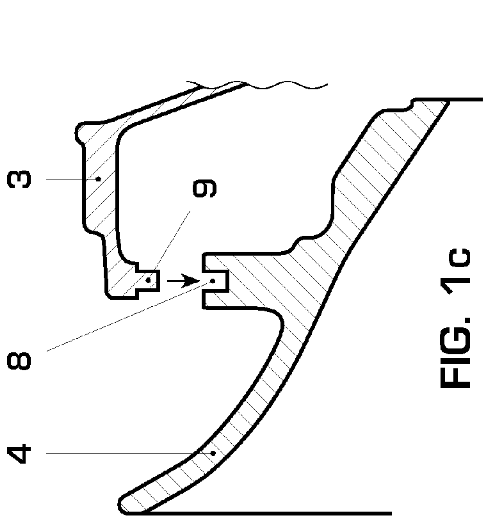
FIG. 1*c* shows the detailed view according to FIG. 1*b* directly before assembly.

Depending upon the constructional configuration of the connecting region 10, 10', via which the casing end section 4 is connected to the center casing section 3, or the casing end section 5 is connected to the center casing section 3, a mechanical reworking is required of the parting edges which are created after the separation. For example, in the case of the exemplary embodiment which is shown, it would make sense to mechanically mill the connecting region 10 after the separation of the casing end section 4 along the parting line 6 from the center casing section 3 so that a situation is created in which the rib-like projection 9 along the parting edge on the center casing section 3 can be inserted in the slot-shaped recess 8 along the parting edge of the casing end section 4, according to the detailed view of FIG. 1*c*. In the detailed view of FIG. 1*c*, the production of a loose but positively-locking joint connection between the casing end section 4 and the center casing section 3 is shown by the center casing section 3 being fitted by the rib-like projection 9 in the slot-shaped recess 8 of the casing end section 4 in a positive-locking manner. The joint connection which is formed in the style of a tongue-and-groove connection, which is also called a suspension, enables a radial as well as axial compensation between the two casing parts, which, contingent upon possible thermal material expansions, contributes towards avoiding internal mechanical stresses inside the casing. Naturally, constructional alternative solutions for a positive-locking or non-positive-locking joint connection between the respective separated casing sections are conceivable.

LIST OF DESIGNATIONS

1 Axial parting plane
2 Steam feed volume
3 Center casing section
4, 5 Casing end sections
6, 7 Radial parting plane
8, 8' Slot-shaped recess
9, 9' Rib-like projection
10, 10' Connecting region
$T_{up}$, $T_{down}$ Upper and lower casing half

What is claimed is:

1. A method for producing a cast turbine casing for a rotating machine, comprising:

casting the turbine casing separately in two casing halves which are separable by a parting plane which axially passes through the turbine casing, and in which the two casing halves are each comprised of at least two separate casing sections, each of the casing halves is cast in one piece;

separating each of the casing halves into the at least two casing sections along a radially extending parting plane so that there are at least two axially separated casing sections with respective axially opposite parting edges;

joining the separated casing sections together to form a respective assembled one of the casing halves; and joining the two assembled casing halves together along the parting plane to form the turbine casing, wherein a casting mold is formed and made available in such a way that radially and/or axially opposite joining contours, which are respectively formed in a counter-contoured manner, are provided, respectively, proximate to the parting planes of the casing sections, which are formed by separation, the joining contours being formed as a loose tongue-and-groove connection.

2. The method as claimed in claim 1, wherein after the separating, at least one of the casing sections is reworked along the parting edge.

3. The method as claimed in claim 2, wherein the reworking is carried out by material removal.

4. The method as claimed in claim 1, wherein the turbine casing is formed as an inner casing of a steam turbine stage, the inner casing is separable into three casing sections and has a center section (3) and two end sections (4, 5) which can be attached axially on both sides to the center section.

5. The method as claimed in claim 4, wherein the turbine casing corresponds to an inner casing of a low-pressure steam turbine stage.

6. The method as claimed in claim 1, wherein a casting mold is made available for the casting of each of the two respective casing halves.

* * * * *